(12) United States Patent
Huang

(10) Patent No.: US 11,508,303 B1
(45) Date of Patent: Nov. 22, 2022

(54) DISPLAY APPARATUS

(71) Applicant: SeeYA Optronics Co., Ltd., Shanghai (CN)

(72) Inventor: Zhongshou Huang, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 0 days.

(21) Appl. No.: 17/580,033

(22) Filed: Jan. 20, 2022

(30) Foreign Application Priority Data

Nov. 22, 2021 (CN) .......................... 202111383860.4

(51) Int. Cl.
G09G 3/3233 (2016.01)

(52) U.S. Cl.
CPC ... *G09G 3/3233* (2013.01); *G09G 2300/0842* (2013.01); *G09G 2300/0861* (2013.01); *G09G 2310/0291* (2013.01); *G09G 2310/06* (2013.01); *G09G 2310/08* (2013.01); *G09G 2320/0233* (2013.01)

(58) Field of Classification Search
CPC ......... G09G 3/3233; G09G 2300/0842; G09G 2300/0861; G09G 2310/0291; G09G 2310/06; G09G 2310/08; G09G 2320/0233
See application file for complete search history.

(56) References Cited

U.S. PATENT DOCUMENTS

| | | | | |
|---|---|---|---|---|
| 6,525,709 B1* | 2/2003 | O'Callaghan | ........ | G09G 3/3648 345/98 |
| 6,753,834 B2* | 6/2004 | Mikami | ............... | G09G 3/3258 345/82 |
| 7,187,355 B2* | 3/2007 | Tam | ..................... | G09G 3/3258 345/82 |
| 8,581,805 B2* | 11/2013 | Kimura | ................ | G09G 3/3291 345/82 |
| 9,448,573 B2* | 9/2016 | Lee | .......................... | G05F 1/468 |
| 11,037,488 B1* | 6/2021 | Wang | .................... | G09G 3/3233 |
| 11,222,583 B2* | 1/2022 | Takahashi | ............ | H01L 25/0753 |
| 11,417,272 B2* | 8/2022 | Yang | ....................... | G09G 3/006 |
| 2002/0047817 A1* | 4/2002 | Tam | ..................... | G09G 3/3258 345/76 |
| 2002/0140659 A1* | 10/2002 | Mikami | ............... | G09G 3/3258 345/90 |
| 2003/0142048 A1* | 7/2003 | Nishitani | .............. | G09G 3/3258 345/82 |
| 2005/0067968 A1* | 3/2005 | Yamashita | ........... | G09G 3/3266 315/169.3 |
| 2009/0121987 A1* | 5/2009 | Fukutome | .............. | G09G 3/342 345/82 |

(Continued)

Primary Examiner — Michael J Jansen, II
(74) Attorney, Agent, or Firm — Kolitch Romano Dascenzo Gates LLC

(57) ABSTRACT

A display apparatus is provided to include a pixel array composed of a plurality of pixels. Each pixel includes a pulse-generating unit producing a first pulse and a second pulse with opposite phases; a first switching unit; a light-emitting unit; and a second switching unit. The first switching unit, the light-emitting unit, and the second switching unit are connected in series, the first switching unit is controlled by the first pulse, and the second switching unit is controlled by the second pulse, and the first switching unit and the second switching unit are configured to be turned on or turned off synchronously.

19 Claims, 11 Drawing Sheets

(56) References Cited

U.S. PATENT DOCUMENTS

| | | | |
|---|---|---|---|
| 2014/0218272 A1* | 8/2014 | Kikuchi | G09G 3/3266 345/77 |
| 2014/0292745 A1* | 10/2014 | Kikuchi | G09G 3/3258 345/82 |
| 2016/0118971 A1* | 4/2016 | Sugiyama | H03K 5/249 341/158 |
| 2016/0232834 A1* | 8/2016 | Kimura | G09G 3/325 |
| 2016/0351130 A1* | 12/2016 | Kikuchi | G09G 3/3233 |
| 2020/0126473 A1* | 4/2020 | Chibashi | G09G 3/3241 |
| 2021/0407377 A1* | 12/2021 | Gao | G09G 3/32 |
| 2021/0407408 A1* | 12/2021 | Yang | G09G 3/3233 |
| 2022/0036821 A1* | 2/2022 | Cong | G09G 3/2014 |
| 2022/0102583 A1* | 3/2022 | Baumheinrich | H01L 27/156 |
| 2022/0198995 A1* | 6/2022 | Ahmed | H01L 27/1255 |
| 2022/0270540 A1* | 8/2022 | Zhai | G09G 3/32 |

\* cited by examiner

DISPLAY APPARATUS

CROSS-REFERENCE TO RELATED APPLICATIONS

This application is based upon and claims priority to Chinese Patent Application No. 202111383860.4, filed on Nov. 22, 2021, the entire contents of which are incorporated herein by reference.

TECHNICAL FIELD

The present disclosure relates to a display apparatus.

BACKGROUND

Micro-LED (Light-emitting Diode) technology refers to the integration of high-density, small-sized LED arrays on one substrate. Depending on the display apparatuses, the size of one single pixel ranges from several micrometers to several hundreds of micrometers. The LED in one pixel is smaller than the pixel since the driving circuit occupies a certain area. To drive such a high-density Micro-LED display, a relatively mature method is to attach or electrically connect the LEDs to a CMOS (Complementary Metal Oxide Semiconductor) integrated circuit on a silicon substrate. The Micro-LEDs such as gallium nitride (GaN) crystals are fabricated on a sapphire substrate, have high conversion efficiency, high brightness, long lifetime, ultra-fast response speed, etc., and hence are considered the most ideal light-emitting sources for various displays in the future. Recent years, especially with the gradual maturity of the massive transfer technology of transferring millions of micro-LED devices from a growth substrate (sapphire) to a target substrate (glass substrate or silicon substrate) for electrical connection and mechanical support, it has become feasible to use Micro-LEDs in TV displays, mobile phone displays, and even micro-displays in AR (Augmented Reality) glasses. Compared with the currently widely used organic LED (OLED) display technology, Micro-LED has excellent luminous brightness and long lifespan, and the industry even thinks that Micro-LED technology may eventually replace OLED display technology.

However, the current Micro-LED technology still faces many technical and manufacturing challenges, such as the needs to improve electro-optical conversion efficiency, the full colorization, manufacturing yield and chromaticity uniformity. The conversion efficiency of the GaN LED die, defined as the luminous flux per injected current, is not a constant, but the relationship of the luminous flux in the light emitting area with the injected current is a non-linear function. When the injected current is very small, the conversion efficiency is low, and it gradually increases with the injected current before it reaches a peak value at a certain injected current, then it decreases. During this current changing process, the light spectrum of the GaN LED will exhibit a drift. Therefore, in order to reduce the power consumption and maintain a uniform chromaticity, it is necessary to drive each Micro-LED die of the display apparatus with a fixed current range that keeps the conversion efficiency at a relatively high level. In order to modifying the brightness or color of the pixels, a mature solution is to apply pulse-width modulate (PWM) on each LED die through the drive chip, that is, to realize digital modulation of the brightness by modifying the duty cycle of the current pulse. Although the luminous intensity of the LED driven by each pulse is same, the average brightness perceived by the human eye is still changing with modification of the duration of the light pulse from the LED.

However, due to manufacture process variations or inhomogeneities in the OLED raw materials, the brightness and chromaticity of every Micro-LED will still be different even the Micro-LEDs are driven by the same current. A full-color RGB array has at least hundreds of thousands of LEDs emitting red, green and blue respectively, their brightness difference and chromaticity difference will be directly shown up on the display screen. Conventional approach for this problem is first dicing the epitaxially grown GaN into individual LED dies and sorting them according to their brightness and chromaticity, and then transferring those LED dies whose brightness and chromaticity are similar to one display array. This approach, however, will discard LED dies with luminescence characteristics deviating from those being selected, and then reduce manufacturing yield and increase manufacturing costs. Even for the case of monochromatic LED dies, for example, in the case where blue LED dies are combined with red and green quantum dot light-emitting materials respectively to create full color display, the differences in the brightness and the characteristics of the current in the blue LED dies will still cause both brightness and chromaticity variations across the display.

Applications of the Micro-LED in the AR glasses with extremely high pixel density are facing another technical hurdle and which is becoming more and more obvious. When the LED die is driven by an optimum voltage that is supposed to achieve a better electro-optical conversion efficiency, the optimum voltage may exceed ideal driving voltage range of the transistors in CMOS circuit. With the increase of pixel density, the dimensions of the CMOS transistors driving the LED array and their driving voltages are supposed to be scaled down according to certain rules in semiconductor integrated circuit. This is to suppress various parasitic effects generated under higher driving voltages in silicon substrate, such as the Latch-up effect in CMOS circuits, and the vertical and horizontal leakage currents in substrate. However, since the brightness of the LED die is strongly dependent on the current passed through or the driving voltage applied, the driving voltage of the LED die cannot be simply reduced just for the benefit of reliability of CMOS circuit.

SUMMARY

In order to overcome the technical hurdles described above, the present disclosure provides a display apparatus including a pixel array composed of a plurality of pixels, wherein, each pixel includes a pulse-generating unit, a first switching unit, a light-emitting unit and a second switching unit, and the later three units are connected in series. The first switching unit and the second switching unit are turned on or turned off synchronously. When they are turned on simultaneously, the anode voltage and the cathode voltage are simultaneously applied to the light-emitting unit to excite light. The total driving voltage, which is equal to a difference between the anode voltage and the cathode voltage, is shared by the two switching units and the light-emitting unit. Even the total driving voltage is higher than an ideal operational voltage in a CMOS transistor, less than half of the total driving voltage is actually applied to each switching unit, which greatly reduces the operational risks caused by the parasitic effects. The pulse-generating unit produces two synchronized but opposite PWM pulses, that the first pulse is for controlling the on-off state of the first switching unit, the second pulse is for controlling the on-off state of the second switching unit. Since the first pulse and the second pulse are opposite in phase, noise spikes induced by the rising and falling edges of the pulses in the pixel array are canceled in situ by themselves, resulting in less electronic noise.

The first switching unit and the second switching unit may use different conduction types of MOS (Metal-Oxide-Semiconductor) transistors. For example, the first switching unit may use a PMOS (P-channel MOS) transistor or an NMOS (N-channel MOS) transistor, while the second switching unit may use an NMOS transistor or a PMOS transistor. The pulse-generating unit may include a voltage comparator and a first inverter. The voltage comparator may have a first input terminal and a second input terminal, linking to a data voltage and a sawtooth voltage, respectively. An output port of the voltage comparator is connected to an input terminal of the first inverter. The first inverter produces an inverted PWM pulse with certain time delay for the second switching unit, comparing with the output pulse from the voltage comparator. A first buffer unit, or a voltage follower or a simply time-delay unit can be provided between the output port of the voltage comparator and the first switching unit, to ensure that the phase difference between the first and the second PWM pulses is approximately equal to 180°.

In addition, the voltage comparators in different rows of the pixel array can have sawtooth pulses with opposite phases, for example, voltage comparators in pixels on odd number rows and in pixels on even number rows have sawtooth pulses as input with opposite phase. This scheme can be applied to odd number columns and even number columns as well. The high frequency noises induced by the sawtooth voltages on the bus bars of the pixel array can be canceled by themselves in situ, resulting in less noise interference to the analog signal during the data writing cycle.

The light-emitting unit in each pixel may include one or multiple light-emitting elements connected in series or in parallel. The light-emitting elements having similar chromaticity should be put into one pixel to ensure consistency of chromaticity and white balance of the display image. The intentionally picking up multiple LED dies with different brightness and combining them into one light-emitting unit in a pixel and making sure all pixels in the pixel array having similar brightness in average, will certainly and significantly improve utilization efficiency of the Micro-LED. Regarding the implementation of this approach, two or more Micro-LED dies may be selected from the current—brightness distribution curve, and connect them in series as the light-emitting unit in a pixel. Alternatively, two or more Micro-LED dies may be selected from a voltage-brightness distribution curve and connect them in parallel as the light-emitting unit in a pixel. Picking and combining Micro-LED dies with different brightness in pixel not only significantly improves the manufacturing yield but also results in a better uniformity of the display apparatus.

It should be readily understood that both the foregoing general description and the following detailed description are exemplary and explanatory only, and are not intended as a limitation to the scope of the present disclosure.

BRIEF DESCRIPTION OF THE DRAWINGS

The foregoing and other features, and advantages of the invention are apparent from the following detailed description taken in conjunction with the accompanying drawings in which.

DETAILED DESCRIPTION

In the following, embodiments of the present disclosure will be described in detail with reference to the figures. It should be understood that, the embodiments described hereinafter are only used for explaining the present disclosure, and should not be understood to limit the present disclosure. Besides, for describing the embodiments more clearly, the figures only show some aspects, instead of every aspect, of the present disclosure.

The "first", "second" and similar words used in the present disclosure do not denote any order, quantity or importance, but are only used to distinguish different components. "comprise", "include" and other similar words mean that the elements or objects appearing before these words, the elements or objects listed after these words, and their equivalents, but other elements or objects are not excluded. Similar words such as "connected" are not limited to physical or mechanical connections, but may include electrical connections, whether direct or indirect. "up", "down", etc. are only used to indicate the relative position relationship. When the absolute position of the described object changes, the relative position relationship may also change accordingly.

Figure 1:
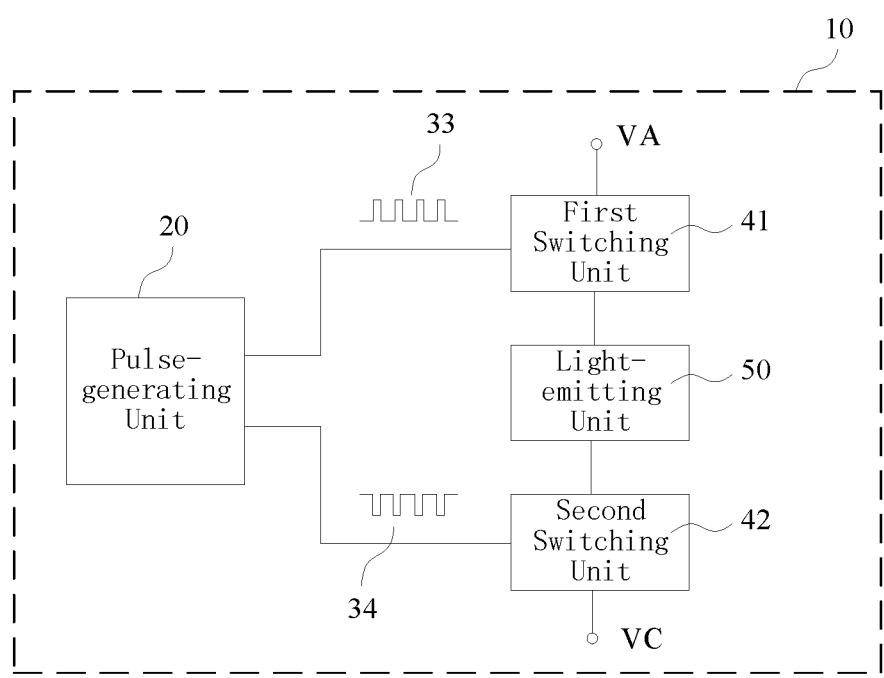
FIG. 1 is a schematic diagram of an equivalent circuit of a pixel of a display apparatus in the present disclosure.

The present disclosure provides a display apparatus including a pixel array including a plurality of pixels, each pixel is self-luminous. FIG. 1 illustrates a schematic diagram of an equivalent circuit of a pixel 10 of a display apparatus. As shown in FIG. 1, each pixel 10 includes a pulse-generating unit 20, a first switching unit 41, a light-emitting unit 50 and a second switching unit. The first switching unit 41, the light-emitting unit 50 and the second switching unit 42 are connected in series. The pulse-generating unit 20 generates a first pulse 33 for controlling the on-off state of the first switching unit 41 and a second pulse 34 for controlling the on-off state of the second switching unit 42, respectively. The first switching unit 41 controls the on-off state between the anode power supply VA and a first end of the light-emitting unit 50, and the second switching unit 42 controls the on-off state between the cathode power supply VC and a second end of the light-emitting unit 50. The first switching unit 41 and the second switching unit 42 are turned on or off synchronously. When the first switching unit 41 and the second switching unit 42 are turned on simultaneously, the anode voltage and the cathode voltage are simultaneously applied to the light-emitting unit 50 to excite light. In this case, the total driving voltage is shared by the first switching unit 41, the second switching unit 42 and the light-emitting unit 50 itself. Even the total driving voltage of the light-emitting unit 50 is higher than an ideal operational voltage in a CMOS transistor, less than half of the total driving voltage is actually applied to each switching unit, which greatly reduces the operational risks resulting from a driving voltage much higher than the ideal driving voltage in the bulk of silicon substrate. In addition, the phases of the first pulse 33 and the second pulse 34 are opposite, the noises in the pixel array caused by the two pulses can be canceled by themselves in situ, resulting in less noise.

Figure 2:
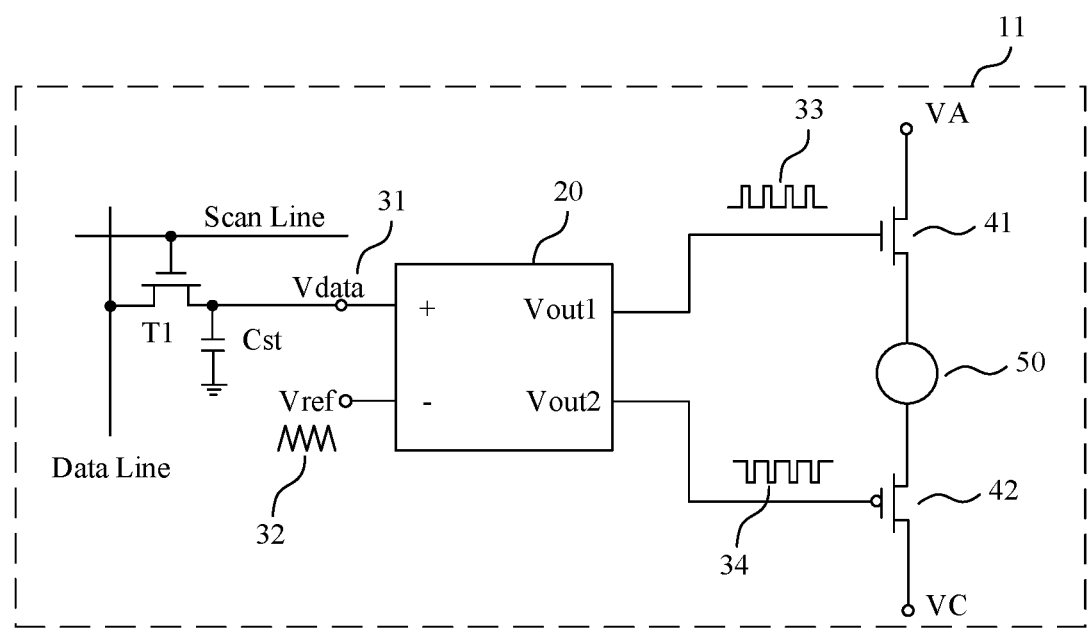
FIG. 2 is a schematic diagram of an equivalent circuit of a pixel of a display apparatus according to a first embodiment of the present disclosure.

FIG. 2 schematically illustrates an equivalent circuit of a pixel of a display apparatus according to a first embodiment of the present disclosure. In the illustrated circuit, T1 is a transistor, one end of T1 is connected to one column of Data Line in the vertical direction, and the other end is connected to the storage capacitor Cst which stores the analog signal voltage in the pixel. The gate of the transistor T1 is connected to one row of Scan Line. The periodic scan pulse on the Scan Line turns on the transistor T1, and allows the external analog signal voltage to be stored in the pixel. The combination of the transistor T1 and the storage capacitor Cst serves as the voltage writing part of a TFT-OLED (Thin Film Transistor OLED) pixel or a silicon-based OLED pixel.

As shown in FIG. 2, every pixel 11 includes a pulse-generating unit 20, a first switching unit 41, a light-emitting unit 50 and a second switching unit 42. The pulse-generating unit 20 has two input terminals, a first input terminal is connected to the storage capacitor Cst and is input with a data voltage (Vdata) which is identified as 31 in FIG. 2. A second input terminal is connected to a sawtooth pulse source and is input with a sawtooth voltage (Vref) which is identified as 32 in FIG. 2. In some embodiments, the sawtooth pulse source is set outside the pixel array and shared by all pixels of the pixel array. In other embodiments, the pixels in different rows can use different sawtooth pulse sources, or each pixel can have its own oscillator which serves as a pulse source to generate the periodic sawtooth pulse. According to the input data voltage (Vdata) and sawtooth voltage (Vref), the pulse-generating unit 20 generates a first pulse Vout1 and a second pulse Vout2, identified as 33 and 34 in FIG. 2, respectively. The first pulse Vout1 and the second pulse Vout2 are opposite in phase. In this embodiment, the phase difference between the first pulse 33 and the second pulse 34 is 180°. Both the first pulse Vout1 and the second pulse Vout2 are digital pulses, that is, the first pulse 33 and the second pulse 34 have their own high amplitudes and low amplitudes. When one pulse is at high amplitude, the other is at low amplitude, and the absolute values of the high amplitude and the low amplitude of two pulses may be same or different.

In this embodiment, the first switching unit 41 uses an NMOS transistor, and the second switching unit 42 uses a PMOS transistor. The first switching unit 41, the light-emitting unit 50 and the second switching unit 42 are connected in series. One of the switching units, such as the first switching unit 41, is connected to the anode power supply VA, more specifically, the drain (or source) of the NMOS transistor of the first switching unit 41 is connected to the anode power supply VA. The other switching unit, such as the second switching unit 42, is connected to the cathode power supply VC, more specifically, the drain (or source) of the PMOS transistor of the second switching unit 42 is connected to the cathode power supply VC. One output terminal of the pulse-generating unit 20 is connected to the gate of the NMOS transistor, and the other output terminal is connected to the gate of the PMOS transistor. Therefore, when the positive pulse is applied to the NMOS transistor, the negative pulse is simultaneously applied to the PMOS transistor, the two transistors are simultaneously turned on, and both the anode voltage and cathode voltage are applied to the light-emitting unit 50 to excite light.

The voltage driving the light-emitting unit 50 (the voltage between the anode power supply VA and the cathode power supply VC) maybe higher than the driving voltage of a single MOS transistor and the silicon-based circuit. As shown in FIG. 2, the total driving voltage is shared by the two transistors and the light-emitting unit, that is, the voltage applied to each transistor is less than half of the entire total driving voltage (VA-VC), which can greatly reduce the risk of adverse effects, such as latch-up effects, in highly integrated CMOS chips. The rising edges and falling edges of the first pulse and the second pulse can cause various parasitic capacitances or parasitic effects in the pixel array, which induces impulse noises. Because the first pulse 33 and the second pulse 34 have opposite phases, the impulse noises can be canceled by themselves in situ, resulting in less noise.

In this embodiment, the first switching unit 41 can be a PMOS transistor, and the second unit 42 can be an NMOS transistor, that is, both the first switching unit 41 and the second switching unit 42 are MOS transistors. In other alternative embodiments, the first switching unit 41 and the second switching unit 42 may also be electronic switches with electrons or holes as conductive carriers, such as N-type and P-type bipolar transistors (BJT) or N-type/P-type field Effect transistor (FET).

In addition to adjust the pulse-generating unit 20 to generate the first pulse 33 and the second pulse 34 with various amplitudes and bias voltages, the threshold voltage of the MOS transistors of the first switching unit 41 and the second switching unit 42 can also be appropriately adjusted to ensure that the first pulse 33 and the second pulse 34 can simultaneously turn on or turn off the first switching unit 41 and the second switching unit 42.

Due to the difference of the pulse-generating units and the difference of the loads, the rising edges and falling edges of the first pulse and the second pulse may have a certain delay or lead, however, the first pulse 33 and the second pulse 34 still can synchronously turn on or off the first switching unit 41 and the second switching unit 42. For simplicity, pulses with a certain delay or lead are still referred as phases with opposite phases, which do not deviate from the basic concept of the present disclosure. In the first embodiment, the light-emitting unit 50 includes one or more light-emitting elements. The light-emitting elements may be organic light-emitting diodes, or inorganic light-emitting diodes such as gallium nitride light-emitting diodes (GaN LED dies), gallium arsenide light-emitting diodes (GaAs LED dies), or LED dies with other electroluminescent films. When the light-emitting unit 50 includes a plurality of light-emitting elements, the light-emitting elements have same chromaticity. The kind of the same color includes red, green, blue, orange, cyan, yellow and white. Except materials in the crystal LEDs, raw materials in the other LEDs (such as thin films in organic light-emitting diodes) have low mobility.

Therefore, the threshold voltages of LED dies are relatively high and the total driving voltages to reach certain brightness are between 5V to 10V. The high total driving voltage may break through the gate insulating film in the CMOS, so that the leakage currents between diffusion layers, or between the diffusion layer and the silicon substrate are large. The high total driving voltage also causes parasitic effects such as latch-up effect. However, in the first embodiment, the total driving voltage is shared by the two transistors, so that the risk of adverse effects, such as latch-up effect and leakage currents in the CMOS is greatly reduced, which significantly improves the product yield, reduces costs and expands the application scope of Micro-LED in various display apparatus.

Figure 3:
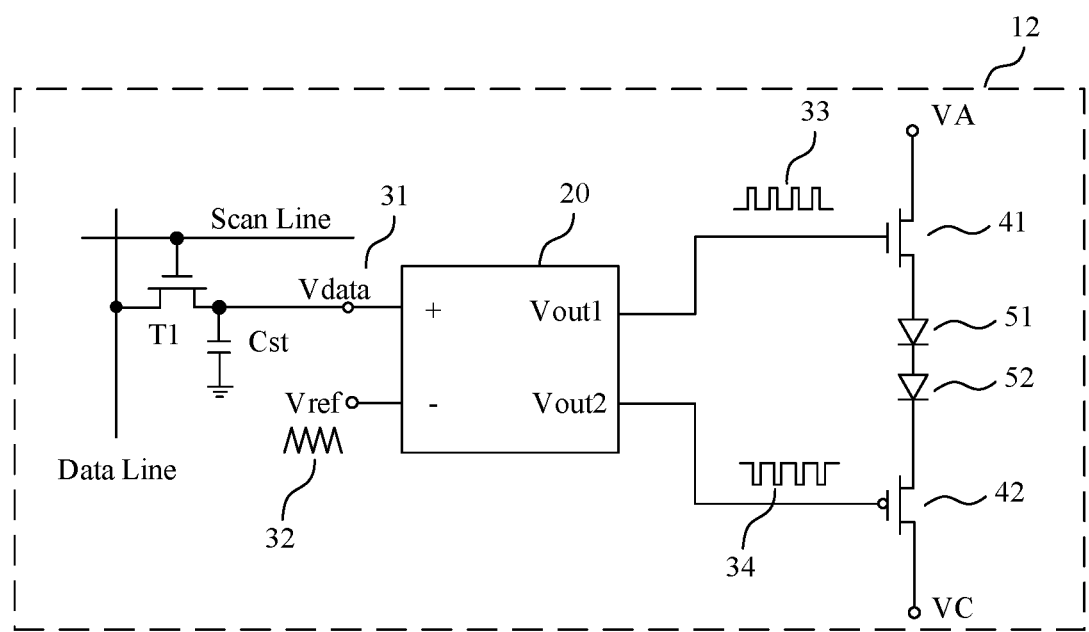
FIG. 3 is a schematic diagram of an equivalent circuit of a pixel of a display apparatus according to a second embodiment of the present disclosure.

FIG. 3 schematically illustrates a second embodiment of the present disclosure. The difference between the pixel 12 in FIG. 3 and the pixel 11 in FIG. 2 is that the light-emitting unit includes two series-connected LED dies, a first LED die 51 and a second LED die 52. The first LED die 51 and the second LED die 52 have same chromaticity. The kind of the same color includes red, green, blue, orange, cyan, yellow and white. Assuming that the total driving voltage of each LED die to reach a certain brightness is 2.5V, the total driving voltage of the light-emitting unit including two series-connected LED dies is 5V, that is, if ignoring the resistances of the first switching unit 41 and the second switching unit 42, the voltage between the anode power supply VA and the cathode power supply VC is 5V (VA-VC). The maximum voltage drop of the transistor of each switching unit is 2.5V. For a highly integrated CMOS, the working voltage and the withstand voltage of the gate insulating film decrease in a certain proportion as the transistor becomes smaller. The reduced working voltage is beneficial to minimization of the transistors, so that the transistors can be better adapted to highly integrated display apparatuses.

In the traditional picking method and transfer method of LED dies, if the brightness or color variations of LED dies from one sapphire wafer are too large, then the LED dies are not used on the same display apparatus to avoid non-uniformity of brightness and chromaticity. As a result, LED dies with different luminescence characteristics will be discarded, and the utilization efficiency or yield of the LED dies grown epitaxially on the sapphire wafer will be reduced and the cost of the display apparatus will be greatly increased accordingly. Another advantage of the pixel 12 of the second embodiment adopting two series-connected LED dies is to improve utilization efficiency of the wafer as well as the uniformity of luminescence and color of the display apparatus. Specifically, by series-connecting two LED dies to form a light-emitting unit, even if single LED die is randomly selected, the luminous flux of the light-emitting unit is twice that of one single LED die, and the mean square error of the luminous flux of the light-emitting unit is 1.4 ($\sqrt{2}$) times that of one single LED die. In fact, the GaN LED dies can be picked according to certain rules, and the LED dies with different brightness can be combined, which will not only improve the uniformity of luminescence of each pixel, but also improve utilization efficiency of the GaN LED dies.

Figure 4:
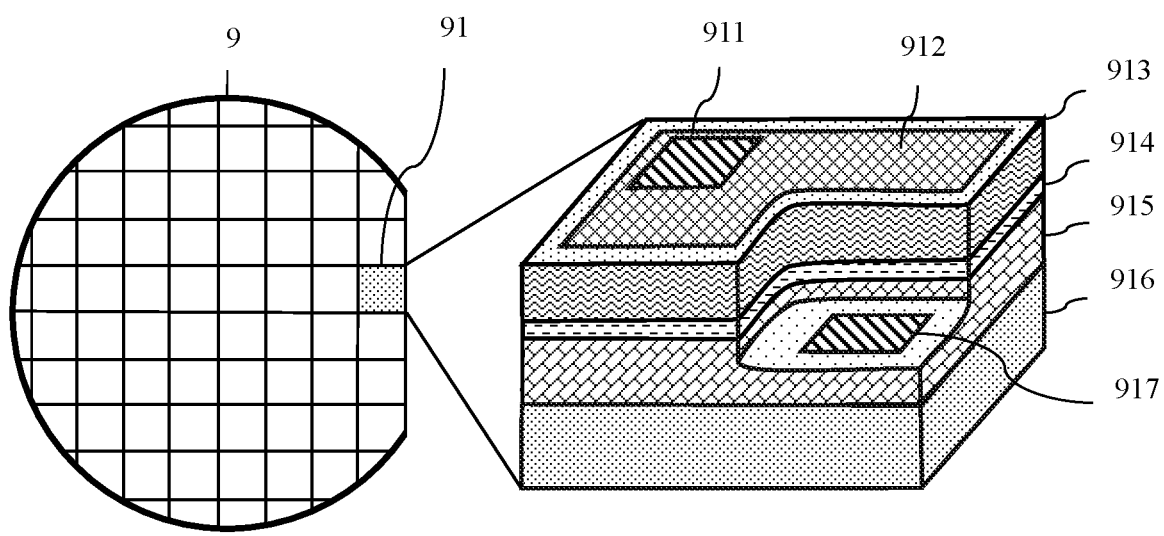
FIG. 4 is a schematic diagram of a single LED die obtained by cutting a sapphire wafer.

FIG. 4 schematically illustrates a multilayer film 9 of GaN LEDs and a GaN LED die 91 cut from the multilayer film 9. The left side of FIG. 4 shows a schematic diagram of the multilayer film 9 of GaN LEDs grown by MOCVD (Metal Oxide Chemical Vapor Deposition) on a sapphire ($Al_2O_3$) wafer 916. The multilayer film 9 is cut to obtain a plurality of single GaN LED dies 91, the structure of GaN LED die is illustrated in the right side of FIG. 4. Each GaN LED die 91 includes a light-emitting layer 914 sandwiching an MQW (Multilayer Quantum Well), a P-type GaN layer 913 and an N-type GaN layer 915. Each GaN LED die 91 further includes a cathode 917, and an anode 911. As illustrated, a cutout is made to obtain a terminal of the cathode 917. The GaN LED die further includes a transparent electrode ITO (Indium Tin Oxide) window 912 for outputting LED light. The MOCVD growth process on the wafer, the cutting process as well as the electrode manufacturing process will affect uniformity of brightness and chromaticity of LED dies. It is assumed that the statistic distribution curve of brightness of the LED dies is similar to the Gaussian distribution curve based on the brightness in FIG. 5, and the statistic distribution of the chromaticity of the LED die is similar. Suppose only those LED dies whose brightness is within a range of plus or minus one Sigma from the median value are picked for the pixel array, only 68% of the LED dies whose brightness are near the median value (the peak of distribution curve) will be used, and nearly 32% of the LED dies whose brightness is one Sigma away from the peak of distribution curve will be wasted. In the present disclosure, since a light-emitting unit includes two LED dies, two LED dies can be picked and be series-connected to be configured as one pixel. For example, one LED die in the left of Gaussian distribution median and one LED die in the right of Gaussian distribution median are selected and the left side LED die and the right side LED die are symmetrical to the median, or the brightness of two LED dies are symmetrical to the median value in the Gaussian distribution curve. That is, brightness of one LED die is lower than the median value and brightness of another LED die is higher than the median value, respectively. In other words, if the median value of the Gaussian distribution curve (if it is an asymmetric distribution, use the median value instead of the mean value) is used as a dividing line, pick one LED die whose brightness is to the left of the median value and one LED die to the right of the median value, the brightness of every two combined LED dies is basically same. In theory, except the LED dies that do not emit light, all other LEDs on the sapphire wafer can be utilized.

The median value of a statistic distribution means the number of the samples on the left side of the median and the number of the samples on the right side of the median are essentially equal. Though not all statistic distributions of LED die follow an ideal Gaussian distribution, but the technical solutions for better LED die utilization and performance uniformity described herein after are still applicable.

Figure 5:
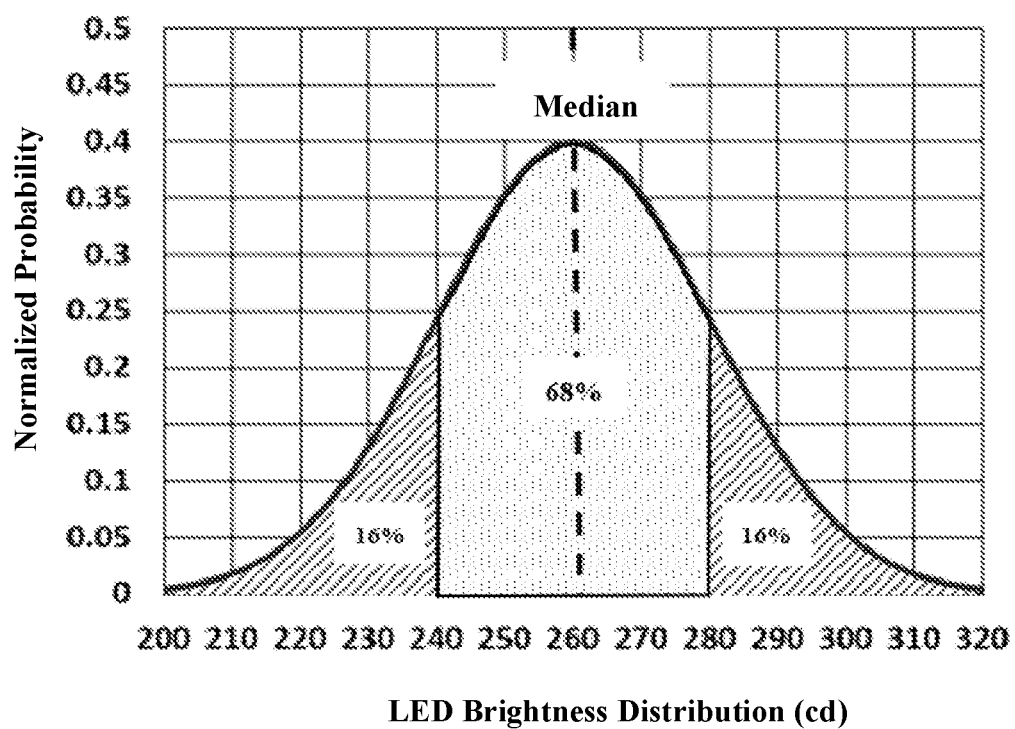
FIG. 5 is a brightness distribution curve of LED dies.

The statistic distribution curve in FIG. 5 is based on the brightness of all LED dies on one sapphire wafer, and the excitation current to each LED die is equal. In some embodiments of the present disclosure, two LED dies (51, 52) included in the light-emitting unit are selected from left and right side of the statistic distribution curve that are approximately central symmetrical to the median value of the statistic distribution curve. When two LED dies (51, 52) are connected in series according to FIG. 3 and are driven by the same current, the average brightness is approximately same as that of other two LED dies picked by the same method. Therefore, if the display apparatus includes two series-connected LED dies (51, 52) picked by above-mentioned method and driven by the same current, a brightness difference between different light-emitting units that have the same color can be managed to be less than 10% of the average brightness of the light-emitting units having the same color, based on the repeatability and reproducibility of conventional MOCVD process and dicing process. That is to say, the overall uniformity of luminescence of the display apparatus is enhanced, a higher proportion of LED dies from the LED film can be used for the display apparatus, the utilization efficiency of the LED dies and the product yield are improved correspondingly, which will reduce the cost of the display apparatus and can eventually expand the application scope of Micro-LED die. In other embodiments, when the light-emitting unit includes more than two series-connected LED dies, for example, includes three series-connected LED dies, LED dies still can be picked based on the brightness distribution, so that the brightness difference between different light-emitting units having the same color is less than 10% of the average brightness of the light-emitting units having the same color.

Figure 6:
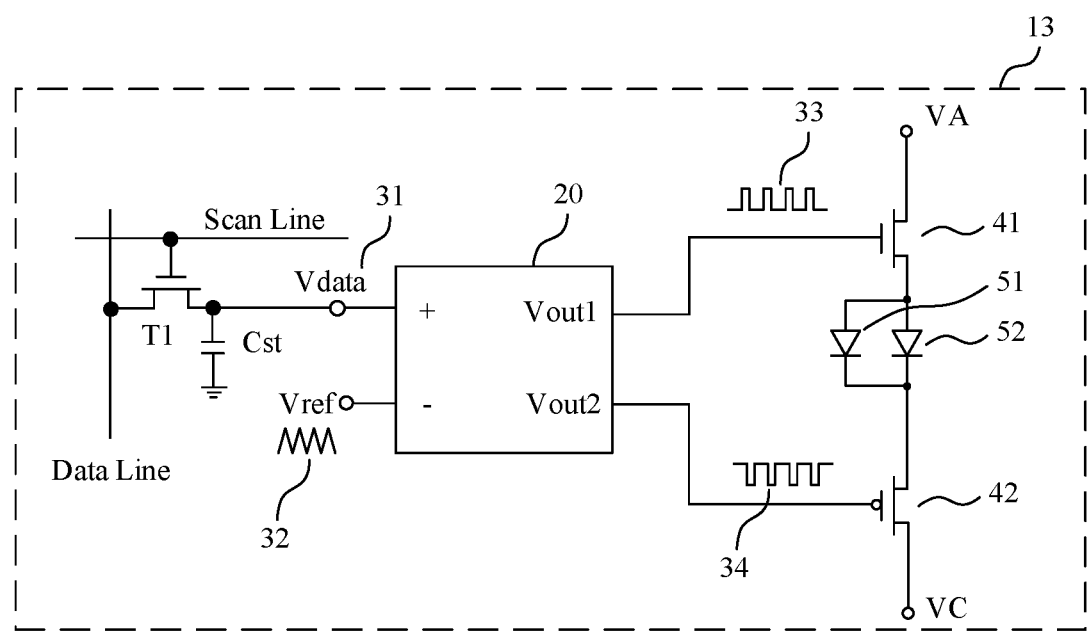
FIG. 6 is a schematic diagram of an equivalent circuit of a pixel of a display apparatus according to a third embodiment of the present disclosure.

FIG. 6 schematically illustrates a third embodiment of the present disclosure. The difference between the pixel 13 illustrated in FIG. 6 and the pixel 12 illustrated in FIG. 3 is that the light-emitting unit includes two parallel-connected LED dies (51, 52). In the manufacturing process, the connecting method and packaging process for parallel-connected LED dies is simpler than those for series-connected LED dies. Two parallel-connected LED dies (51, 52) have the same chromaticity. The color may be red, green, blue, orange, cyan, yellow and white. In third embodiment, the picking and pairing of the LED dies is based on the statistic distribution curve of brightness of LED die where the brightness is measured under a condition that a same voltage is applied to every LED die. For example, two LED dies can be picked and be parallel-connected to be configured as one pixel, the brightness of two LED dies are symmetrical to the median value in the brightness distribution curve, that is, brightness of one LED die is lower than the median value, brightness of another LED die is higher than the median value and the brightness of both LED dies are symmetrical to the median value. Since a pair of LED dies in each pixel is driven in parallel, the brightness of two combined LED dies is basically equal to that of other pixels. In some embodiments, if light-emitting units are applied with the same driving voltage, the brightness difference between different light-emitting units having the same color can be managed to be less than 10% of the average brightness of the light-emitting units having the same color. That is to say, the overall uniformity of luminescence of the display apparatus is enhanced, a higher proportion of LED dies can be used, the utilization efficiency of the LED dies and the product yield are improved correspondingly, which will reduce the cost of the display apparatus and can eventually expand the application scope of Micro-LED. In other embodiments, when the light-emitting unit includes more than two parallel-connected LED dies, for example, includes three parallel-connected LED dies, LED dies still can be picked based on the brightness distribution at the same voltage, so that the brightness difference between different light-emitting units having the same color is less than 10% of the average brightness of the light-emitting units having the same color.

The purpose of the technical solutions of the second embodiment and the third embodiment is to realize a uniform brightness in each pixel, and therefore a uniform brightness in the display apparatus. These technical solutions and associated circuits may be applicable to achieving a uniform chromaticity in each pixel. Two LED dies that have different chromaticity coordinates on an 2D chromaticity diagram can be combined in one pixel for an averaged chromaticity in that pixel, particularly when the chromaticity coordinates of the two LED dies lie on opposite side of their averaged chromaticity coordinates.

It should be noted that due to the manufacture process variations, especially the MOCVD process variations of GaN or GaAs, the LED brightness and chromaticity in different batches or on different LED wafers are varied. In order to reduce the above-mentioned performance variations and then improve the production yield of LED dies as well as the brightness uniformity of display apparatus, two LED dies, whose brightness values lie on left and right side of the median value of the brightness distribution curve, can be picked and combined in one pixel. In some embodiments, two LED dies, whose brightness values lie on left and right side of the median value of the statistic distribution curve, can be picked and combined in one pixel even these two LED dies are not symmetrical to the median value. In practice, it is even feasible to combined two LED dies whose brightnesses are both higher the median value (i.e., both at the right side of media value) or both lower than the median value (i.e., both at the left side of media value) on a particular LED wafer as long as their averaged brightness is approximately equal to the brightness of other pixels with the same color in the display apparatus.

Figure 7:
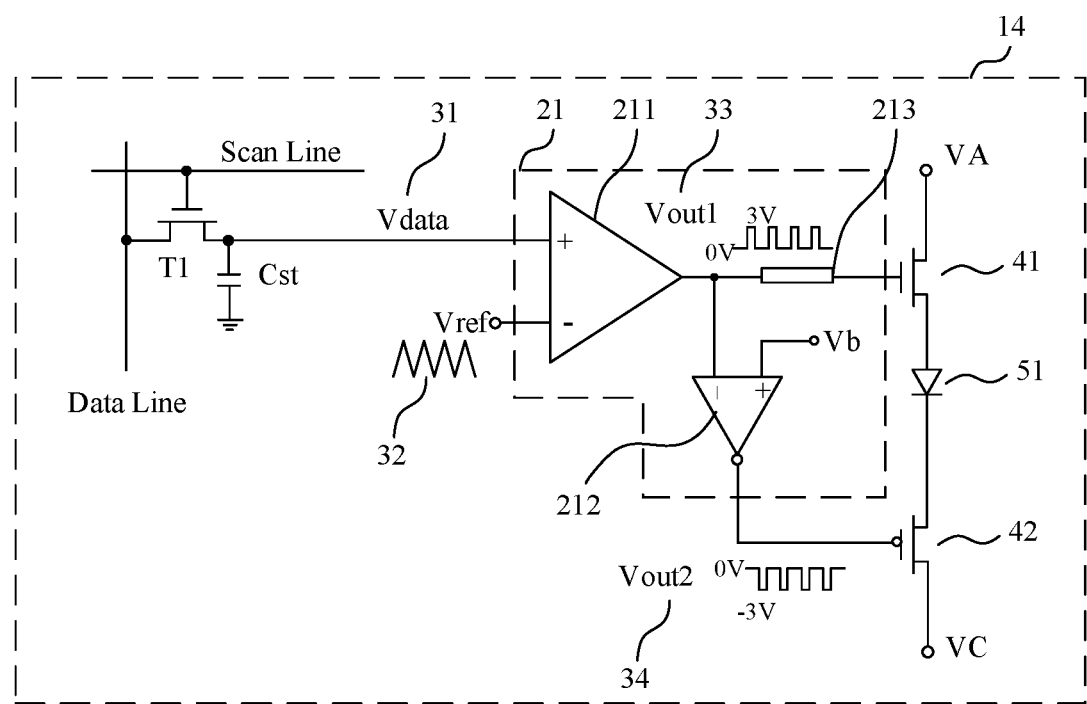
FIG. 7 is a schematic diagram of an equivalent circuit of a pixel of a display apparatus according to a fourth embodiment of the present disclosure.

FIG. 7 schematically illustrates a fourth embodiment of the present disclosure. The difference between the pixel 14 illustrated in FIG. 7 and the pixel 11 illustrated in FIG. 2 lies in the structure of the pulse-generating unit. In the fourth embodiment, the pulse-generating unit 21 of the pixel 14 outputs two PWM pulses with opposite phases. The pulse-generating unit 21 includes a voltage comparator 211 and an inverter 212 to generate the first pulse 33 and second pulse 34, respectively. Specifically, a first input terminal and a second input terminal of the voltage comparator 211 are respectively input with a data voltage Vdata and a sawtooth voltage Vref. An input terminal of the inverter 212 is connected to the output terminal of the voltage comparator 211. The output terminal of the inverter 212 outputs the second pulse 34. Since the second pulse 34 is output from an additional CMOS inverter and it has an additional delay. The output terminal of the voltage comparator 211 outputs the first pulse 33. In some embodiment, a time-delay circuit 213 may be provided between the output terminal of the voltage comparator 211 and the gate of the transistor of the first switching unit 41, so that the pulse delay of the first pulse 33 and that of the second pulse 34 output from the inverter 212 are substantially equal. Through the above structure, the phase difference between the first pulse 33 controlling the first switching unit 41 and the second pulse 34 controlling the second switching unit 42 is close to 180°, thereby avoiding the reduction of the effective light-emitting time of the LED.

In this embodiment, the time-delay circuit 213 can be a simple RC circuit, wherein the resistance R and the capacitance C may be wire distributed, resistance or wire distributed capacitance, or may be discrete resistor and discrete capacitor respectively.

In FIG. 7, the light-emitting unit includes one LED die 51. In other embodiments, the light-emitting unit may include two parallel-connected LED dies illustrated in FIG. 6, or two series-connected LED dies illustrated in FIG. 3, or more than two LED dies.

Figure 8:
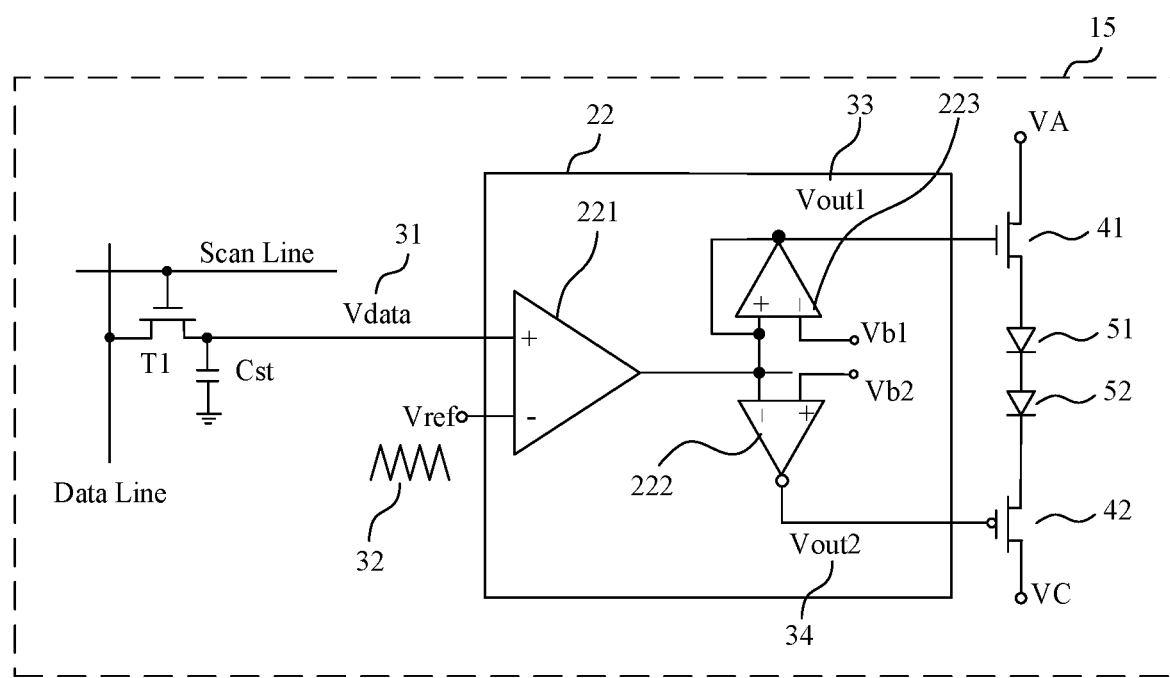
FIG. 8 is a schematic diagram of an equivalent circuit of a pixel of a display apparatus according to a fifth embodiment of the present disclosure.

FIG. 8 schematically illustrates a fifth embodiment of the present disclosure. The difference between the pixel 15 illustrated in FIG. 8 and the pixel 14 illustrated in FIG. 7 lies in the structure of the pulse-generating unit 22. In the fifth embodiment, the pulse-generating unit 22 includes a voltage comparator 221, an inverter 222 and a buffer 223. The buffer 223 serves as a voltage follower, that is, the time-delay circuit 213 in FIG. 7 is replaced by the buffer 223. The output terminal of the voltage comparator 221 is respectively connected to an input terminal of the inverter 222 and an input terminal of the buffer 223, and then two PWM pulses with opposite phases, the first pulse 33 and the second pulse 34, are output from the buffer 223 and the inverter 222, respectively. The output pulse of the voltage comparator 221 controls the first switching unit 41 through the buffer 223. In the above structure, the first pulse 33 and the second pulse 34 undergo similar processing and their delays can be adjusted to be approximately equal. At the same time, the above structure greatly improves the driving ability of the first pulse 33 and the second pulse 34. In some embodiments, discrete capacitors may be provided between the first pulse 33 and the gate of the transistor of the first switching unit 41, and between the second pulse 34 and the gate of the transistor of the second switching unit 42, which will improve the operational stability against noises and leakage currents.

Illustrated in FIG. 8, the light-emitting unit includes two series-connected LED dies (51,52). In some embodiments, the light-emitting unit may include two parallel-connected LED dies as illustrated in FIG. 6, or one LED die as illustrated in FIG. 7, or even more than two LED dies connected in series or in parallel.

Figure 9:
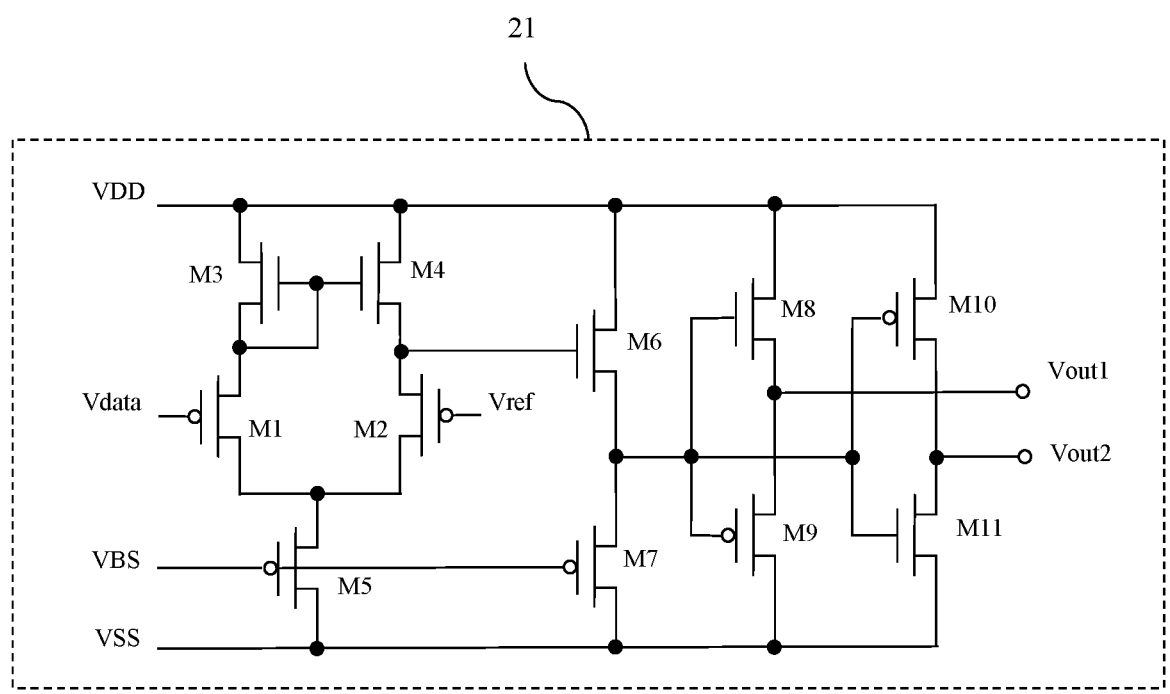
FIG. 9 is a schematic circuit diagram of a pulse-generating unit according to one embodiment of the present disclosure.

FIG. 9 illustrates a schematic circuit diagram of a pulse-generating unit of the present disclosure. As shown in FIG. 9, the pulse-generating unit 21 includes a plurality of transistors, M1 to M11. The source (or drain) of the transistor M3 is input with the first power signal VDD, the gate of the transistor M1 is input with the data voltage Vdata, the gate of the transistor M5 is input with the second power signal VBS, the source (or Drain) the transistor M5 is input with the third power signal VSS, and the gate of the transistor M2 is input with the sawtooth signal Vref. The circuit composed of transistors M1, M2, M3, M4 and M5 serves as a voltage comparator with a certain bias voltage. The data voltage Vdata is input from the storage capacitor Cst of the analog circuit, and the sawtooth signal Vref is input from an external periodic sawtooth pulse source. The circuit composed of transistor M6 and transistor M7 serves as a voltage follower with a certain bias voltage Vss. The circuit composed of transistors, M1 to M7 serves as a two-stage open-loop comparator.

The NMOS transistor M8 and the PMOS transistor M9 form an output buffer unit for a forward PWM pulse Vout1, that is, this buffer unit outputs the first pulse. The PMOS transistor M10 and the NMOS transistor M11 form another output buffer unit for a reverse PWM pulse Vout2, that is, this buffer unit outputs the second pulse.

The structure of the pulse-generating unit 21 in FIG. 9 can be applied to the aforementioned first, second, third and fifth embodiments. The pulse-generating unit with other types of voltage comparators, voltage followers or inverters can be used and is within the spirit and scope of the present disclosure. For example, in order to reduce the false triggering of input noise, an inverting or non-inverting voltage comparator with positive feedback can be used so that the voltage comparator has certain hysteresis function of the voltage comparator to prevent it from responding to the input high-frequency noise. At the same time, the display apparatus may include other types of PWM pulse-generating unit to output a positive PWM pulse and a negative PWM pulse. The positive PWM pulse and the negative PWM pulse have a phase difference of approximately 180° and control the on and off status of the first switching unit and the second switching unit, respectively.

Figure 10:
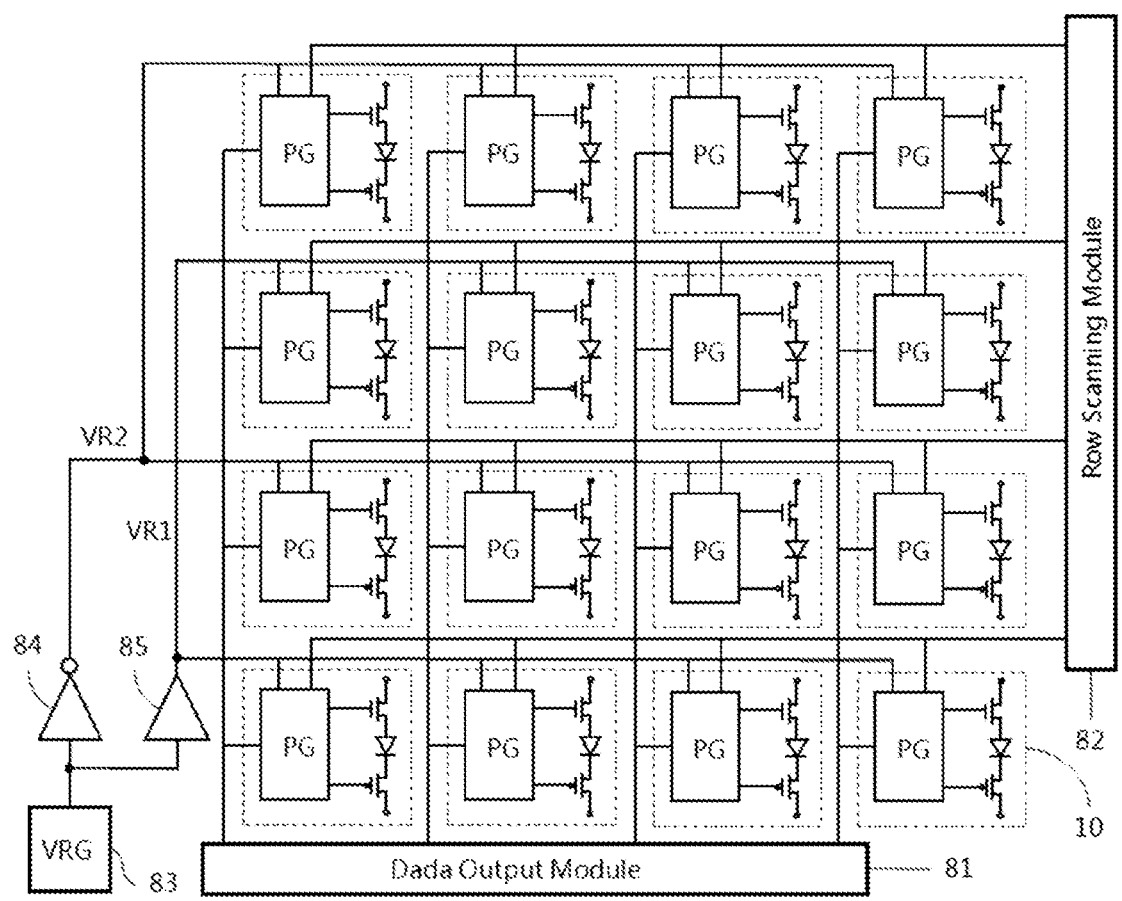
FIG. 10 is a schematic diagram of an equivalent circuit of a pixel of a display apparatus according to a sixth embodiment of the present disclosure.

FIG. 10 schematically illustrates an equivalent circuit of pixel array in a display panel of a display apparatus according to a sixth embodiment of the present disclosure. The pixel array includes a plurality of pixels 10 arranged horizontally and vertically in an orthogonal matrix. A data output module 81 is located at the bottom of the display apparatus, which is parallel-connected to the data lines of every column pixel and used to output data of each column of pixels. A row scanning module 82 is located on the right side of the display apparatus, which is used to sequentially scan each row of pixels from top to bottom or from bottom to top. The scan pulse sequentially turns on the switches of each row of pixels, such as the transistor T1 in FIG. 2, and then the data signal is written into the storage capacitor of each row of pixels, such as the storage capacitor Cst in FIG. 2.

Figure 11:
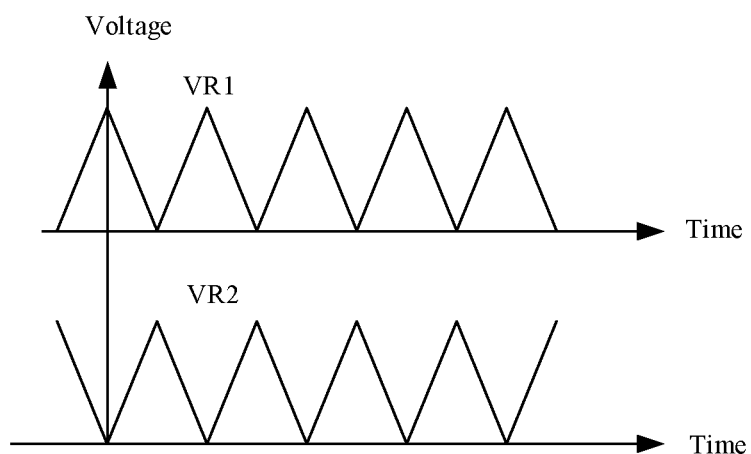
FIG. 11 is a schematic diagram of two sawtooth pulses according to the sixth embodiment of the present disclosure.

In FIG. 10, a sawtooth pulse-generating unit 83 is used as a sawtooth pulse source to output sawtooth voltages. Specifically, the output terminal of the sawtooth pulse-generating unit 83 outputs the first sawtooth pulse VR1 through a voltage buffer 85, and outputs the second sawtooth pulse VR2 through an inverter 84. The phases of the first sawtooth pulse VR1 and the second sawtooth pulse VR2 are opposite. As illustrated in the pulse waveform of FIG. 11, the first sawtooth pulse VR1 and the second sawtooth pulse VR2 have the same amplitude, and the phase difference between them is 180°. The first sawtooth pulse VR1 and the second sawtooth pulse VR2 with opposite polarities drive the first group of pixels and the second group of pixels in the pixel array, respectively. The high frequency noises induced on the data line by VR1 and VR2 are canceled in situ by themselves.

Further, in this embodiment, the pixel array includes two sets of pixels, which are respectively located in odd number rows and even number rows, or respectively located in odd number columns and even number columns. The first sawtooth pulse VR1 is input to the second input terminal of the voltage comparator of the pixels in even number rows or the pixels in even number columns, that is, the pixels in even number rows or the pixels in even number columns are controlled by the first sawtooth pulse VR1. The second sawtooth pulse VR2 is input to the second input terminal of the voltage comparator of the pixels in odd number rows or the pixels in odd number columns, that is, the pixels in odd number rows or the pixels in odd number columns are controlled by the second sawtooth pulse VR2. The first sawtooth pulse VR1 and the second sawtooth pulse VR2 with opposite phases drive half of the pixel array, respectively, and the high frequency noises induced on the data line can be canceled by themselves in situ, which can decrease the interference to analog signals at the data writing stage and reduce the false triggering of the PWM generator.

The following section describes additional aspects and features of the display apparatus and the display panel according to the present disclosure, without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below may expressly refer to and further limit other paragraphs, providing without limitation examples of some of the suitable combinations.

A0. A display apparatus comprising: a pixel array composed of a plurality of pixels, wherein each pixel comprises: a pulse-generating unit producing a first pulse and a second pulse with opposite phases; a first switching unit; a light-emitting unit; and a second switching unit, wherein the first switching unit, the light-emitting unit, and the second switching unit are connected in series, the first switching unit is controlled by the first pulse, and the second switching unit is controlled by the second pulse, and the first switching unit and the second switching unit are configured to be turned on or turned off synchronously.

A1. The display apparatus according to paragraph A0, wherein the pulse-generating unit comprises: a voltage comparator having a first input terminal and a second input terminal, wherein the first input terminal is input with a data voltage and the second input terminal is input with a sawtooth pulse, and an output terminal of the voltage comparator outputs the first pulse; and an inverter, wherein an input terminal of the inverter is connected to an output terminal of the voltage comparator and an output terminal of the inverter is configured to output the second pulse.

A2. The display apparatus according to paragraph A0, wherein the first switching unit comprises a NMOS transistor; and the second switching unit comprises a PMOS transistor.

A3. The display apparatus according to paragraph A1, wherein the pulse-generating unit further comprises a buffer unit, and an output pulse of the voltage comparator controls the first switching unit through the buffer unit.

A4. The display apparatus according to paragraph A3, wherein the buffer unit comprises a time-delay circuit or a voltage follower.

A5. The display apparatus according to paragraph A3, wherein the voltage comparator comprises a two-stage open-loop comparator; the inverter comprises an inverted output buffer; and the buffer unit comprises a forward output buffer.

A6. The display apparatus according to paragraph A0, wherein, the light-emitting unit comprises a plurality of light-emitting elements with same color, and the light-emitting elements are connected in series.

A7. The display apparatus according to paragraph A6, wherein the plurality of light-emitting elements comprises a first LED die and a second LED die which are selected from a statistic distribution curve of brightness of the LED die in a manner that the first LED die is selected from the left side of the median value of the statistic distribution curve, and the second LED die is selected from right side of the median value of the statistic distribution curve, the brightness of the LED die is measured under the same current.

A8. The display apparatus according to paragraph A6, wherein the color emitted by the light-emitting unit includes one of red, green, blue, orange, cyan, yellow and white.

A9. The display apparatus according to paragraph A0, wherein the light-emitting unit comprises a plurality of light-emitting elements connected in parallel and light-emitting elements emit the same color.

A10. The display apparatus according to paragraph A9, wherein the plurality of light-emitting elements comprises a first LED die and a second LED die which are selected from a statistic distribution curve of brightness of the LED die in a manner that the first LED die is selected from the left side of the median value of the statistic distribution curve, and the second LED die is selected from right side of the median value of the statistic distribution curve, the brightness of the LED die is measured under the same voltage.

A11. The display apparatus according to paragraph A9, wherein the color emitted by the light-emitting unit includes one of red, green, blue, orange, cyan, yellow and white.

A12. The display apparatus according to paragraph A0, wherein the light-emitting unit comprises at least one organic light-emitting diode or/and at least one inorganic light-emitting diode.

A13. The display apparatus according to paragraph A1, wherein the pixel array comprises a first group of pixels and a second group of pixels; a sawtooth pulse-generating unit configured to output a first sawtooth pulse to the first group of pixels and output a second sawtooth pulse to the second group of pixels, wherein the first sawtooth pulse and the second sawtooth pulse have opposite phases; the voltage comparators in the first group of pixels are configured to receive the first sawtooth pulse as an input, the voltage comparators in the second group of pixels are configured to receive the second sawtooth pulse as an input.

A14. The display apparatus according to paragraph A13, wherein the pixel array comprises a plurality of odd number rows comprising the first group of pixels, and a plurality of even number rows comprising the second group of pixels, the odd number row and the even number row are alternately arranged.

A15. The display apparatus according to paragraph A14, wherein the sawtooth pulse-generating unit includes a voltage buffer and an inverter, wherein the voltage buffer is configured to output the first sawtooth pulse to control the pixels in the odd number rows, and the inverter of the sawtooth pulse-generating unit is configured to output the second sawtooth pulse to control the pixels in the even number rows.

A16. The display apparatus according to paragraph A0, wherein the pulse-generating unit comprises a plurality of transistors including two NMOS transistors and two PMOS transistors, wherein one of the two NMOS transistor and one of the two PMOS transistors form an output buffer unit to output the first pulse, and wherein another one of the two PMOS transistors and another one of the two NMOS transistors form another output buffer unit to output the second pulse.

A17. The display apparatus according to paragraph A6, wherein, driven by the same current, a brightness difference between different light-emitting units but having the same color is less than 10% of the average brightness of the light-emitting units having the same color.

A18. The display apparatus according to paragraph A9, wherein, driven by the same voltage, a brightness difference between different light-emitting units but having the same color is less than 10% of the average brightness of the light-emitting units having the same color.

The above descriptions of the present disclosure are given in connection with some specific and preferred embodiments, other embodiments within the scope of the concept of the present invention are not limited to the above descriptions. Modifications and substitutions can be made without departing from the spirit and scope of the present disclosure.

What is claimed is:
1. A display apparatus comprising:
a pixel array composed of a plurality of pixels, wherein each pixel comprises:
a pulse-generating unit producing a first pulse and a second pulse with opposite phases;
a first switching unit;
a light-emitting unit; and
a second switching unit,
wherein the first switching unit, the light-emitting unit, and the second switching unit are connected in series, the first switching unit is controlled by the first pulse, and the second switching unit is controlled by the second pulse, and the first switching unit and the second switching unit are configured to be turned on or turned off synchronously.

2. The display apparatus according to claim 1, wherein the pulse-generating unit comprises:
   a voltage comparator having a first input terminal and a second input terminal, wherein the first input terminal is input with a data voltage and the second input terminal is input with a sawtooth pulse, and an output terminal of the voltage comparator outputs the first pulse; and
   an inverter, wherein an input terminal of the inverter is connected to an output terminal of the voltage comparator and an output terminal of the inverter is configured to output the second pulse.

3. The display apparatus according to claim 1, wherein the first switching unit comprises a NMOS transistor; and the second switching unit comprises a PMOS transistor.

4. The display apparatus according to claim 2, wherein the pulse-generating unit further comprises a buffer unit, and an output pulse of the voltage comparator controls the first switching unit through the buffer unit.

5. The display apparatus according to claim 4, wherein the buffer unit comprises a time-delay circuit or a voltage follower.

6. The display apparatus according to claim 4, wherein the voltage comparator comprises a two-stage open-loop comparator;
   the inverter comprises an inverted output buffer; and
   the buffer unit comprises a forward output buffer.

7. The display apparatus according to claim 1, wherein, the light-emitting unit comprises a plurality of light-emitting elements with same color, and the light-emitting elements are connected in series.

8. The display apparatus according to claim 7, wherein the plurality of light-emitting elements comprises a first LED die and a second LED die which are selected from a group of LED dies in a manner that a brightness of the first LED die is lower than a median value of brightness of the group of LED dies, and a brightness of the second LED die is higher than the median value of the brightness of the group of LED dies, wherein the brightness of the LED die is dies are measured under the same current.

9. The display apparatus according to claim 7, wherein the color emitted by the light-emitting unit includes one of red, green, blue, orange, cyan, yellow and white.

10. The display apparatus according to claim 1, wherein the light-emitting unit comprises a plurality of light-emitting elements connected in parallel and light-emitting elements emit the same color.

11. The display apparatus according to claim 10, wherein the plurality of light-emitting elements comprises a first LED die and a second LED die which are selected from a group of LED dies in a manner that a brightness of the first LED die is lower than a median value of brightness of the group of LED dies, and a brightness of the second LED die is higher than the median value of the brightness of the group of LED dies, wherein the brightness of the LED dies are measured under the same voltage.

12. The display apparatus according to claim 10, wherein, the color emitted by the light-emitting unit includes one of red, green, blue, orange, cyan, yellow and white.

13. The display apparatus according to claim 1, wherein the light-emitting unit comprises at least one organic light-emitting diode or/and at least one inorganic light-emitting diode.

14. The display apparatus according to claim 2, wherein the pixel array comprises
   a first group of pixels and a second group of pixels;
   a sawtooth pulse-generating unit configured to output a first sawtooth pulse to the first group of pixels and output a second sawtooth pulse to the second group of pixels, wherein the first sawtooth pulse and the second sawtooth pulse have opposite phases;
   the voltage comparators in the first group of pixels are configured to receive the first sawtooth pulse as an input, the voltage comparators in the second group of pixels are configured to receive the second sawtooth pulse as an input.

15. The display apparatus according to claim 14, wherein the pixel array comprises a plurality of odd number rows comprising the first group of pixels, and a plurality of even number rows comprising the second group of pixels, the odd number row and the even number row are alternately arranged.

16. The display apparatus according to claim 15, wherein the sawtooth pulse-generating unit includes a voltage buffer and an inverter, wherein the voltage buffer is configured to output the first sawtooth pulse to control the pixels in the odd number rows, and the inverter of the sawtooth pulse-generating unit is configured to output the second sawtooth pulse to control the pixels in the even number rows.

17. The display apparatus according to claim 1, wherein the pulse-generating unit comprises a plurality of transistors including two NMOS transistors and two PMOS transistors, wherein one of the two NMOS transistor and one of the two PMOS transistors form an output buffer unit to output the first pulse, and wherein another one of the two PMOS transistors and another one of the two NMOS transistors form another output buffer unit to output the second pulse.

18. The display apparatus according to claim 7, wherein, driven by the same current, a brightness difference between different light-emitting units but having the same color is less than 10% of an average brightness of the light-emitting units having the same color.

19. The display apparatus according to claim 10, wherein, driven by the same voltage, a brightness difference between different light-emitting units but having the same color is less than 10% of an average brightness of the light-emitting units having the same color.

\* \* \* \* \*